Jan. 14, 1969     R. J. PARKER     3,422,295
PERMANENT MAGNET STATOR WITH SPLIT CASING AND METHOD OF MAKING
Filed Sept. 1, 1966     Sheet 1 of 2

INVENTOR
ROLLIN J. PARKER

BY Harold J. Holt

ATTORNEY

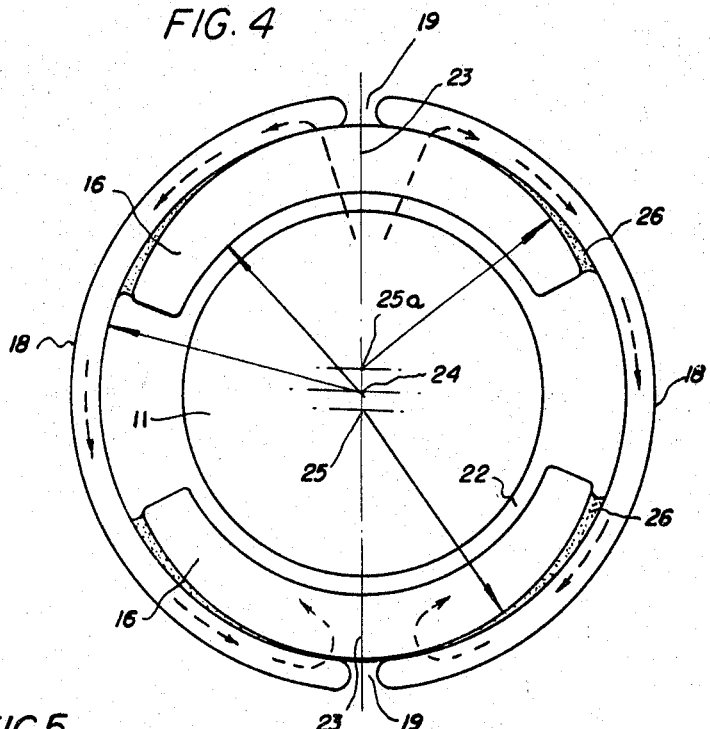
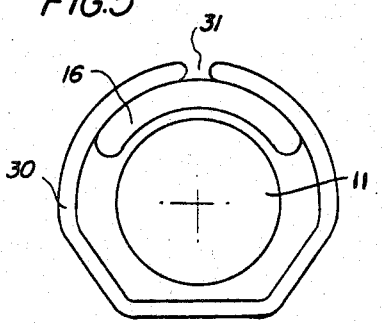 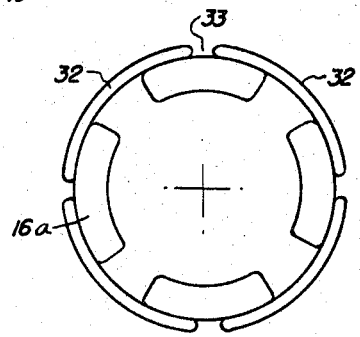
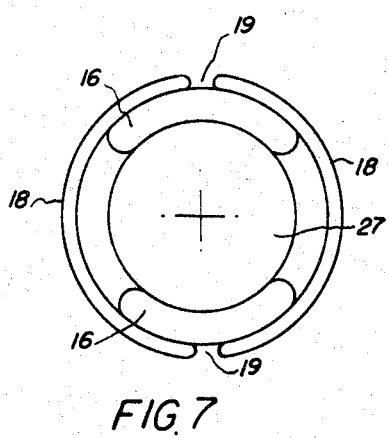
INVENTOR
ROLLIN J. PARKER
BY Harold J. Holt
ATTORNEY

United States Patent Office 3,422,295
Patented Jan. 14, 1969

3,422,295
PERMANENT MAGNET STATOR WITH SPLIT CASING AND METHOD OF MAKING
Rollin J. Parker, Greenville, Mich., assignor to General Electric Company, a corporation of New York
Filed Sept. 1, 1966, Ser. No. 576,663
U.S. Cl. 310—42    11 Claims
Int. Cl. H02k 15/00

This invention relates to a stator assembly and method of forming same, and more particularly to a stator used in a small-size dynamoelectric machine, such as a fractional horsepower motor of the permanent magnet type.

In the manufacture of permanent magnets for dynamoelectric machines, such as fractional horsepower motors, the permanent magnets are made by a casting process, with the result that they are relatively rough and inaccurate in dimensions. In order to obtain accurate air gaps between the magnets and the armature, machining of the magnets is required. This is relatively expensive, particularly since the magnetic materials available are difficult, at best, to machine and grind.

Hence, it would be desirable to provide some method or means for using the magnets "as cast," that is, without machining, and to still obtain the accurate air gap spacing required. Since the magnetic flux produced is limited to begin with, and since it is conventional to use the casing or frame to which the magnets are connected to provide a magnetic flux return path, it becomes important to provide a construction which does not in any way reduce the flux further or interfere with the free flow of the flux.

Hence, it is an object of this invention to provide a stator comprising as-cast permanent magnets secured within an adjustable casing or frame which is formed in such a way as to permit positioning of the magnets relative to the rotor or armature in order to provide accurate air gap spacings, while at the same time forming the casing in such a manner so as to not interfere with or provide additional reluctance to the flow of magnetic flux.

Another object of this invention is to provide a stator formed of permanent magnets joined to a split or segmented casing and wherein the split or segment junctions are arranged at the magnetic neutral zones of the magnets so as to avoid increase in reluctance and permit free flow of the magnetic flux through the casing segments.

These and other objects and advantages of this invention will become apparent upon reading the following description, of which the attached drawings form a part.

In these drawings:

FIGURE 4 is an enlarged, schematic view showing the geometric relationship of the parts.

FIGURE 5 illustrates a modification wherein only one magnet is used, and

FIGURE 6 illustrates a further modification wherein a number of magnets are used.

FIGURE 7 is a schematic end view of the parts being assembled into the stator unit.

Figure 1:
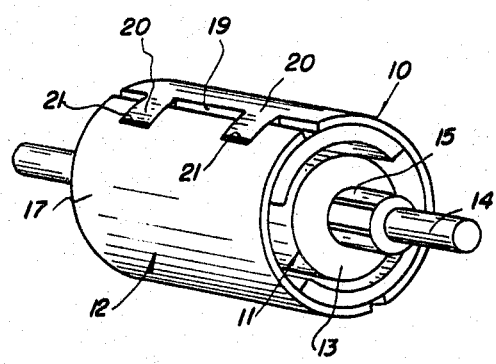
FIGURE 1 is a perspective view of a motor made in accordance with the invention herein.

FIG. 1 illustrates a fractional horsepower motor 10 which includes a rotor 11 and a stator 12. The rotor comprises a conventional armature 13 mounted upon a shaft 14 and having a commutator 15 upon which brushes (not illustrated) are engaged.

Figure 2:
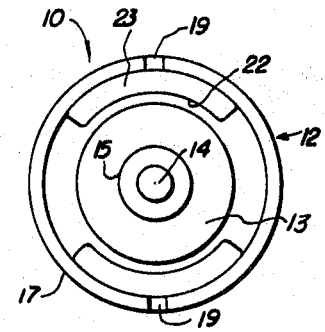
FIGURE 2 is an end view of the motor of FIG. 1.
Figure 3:
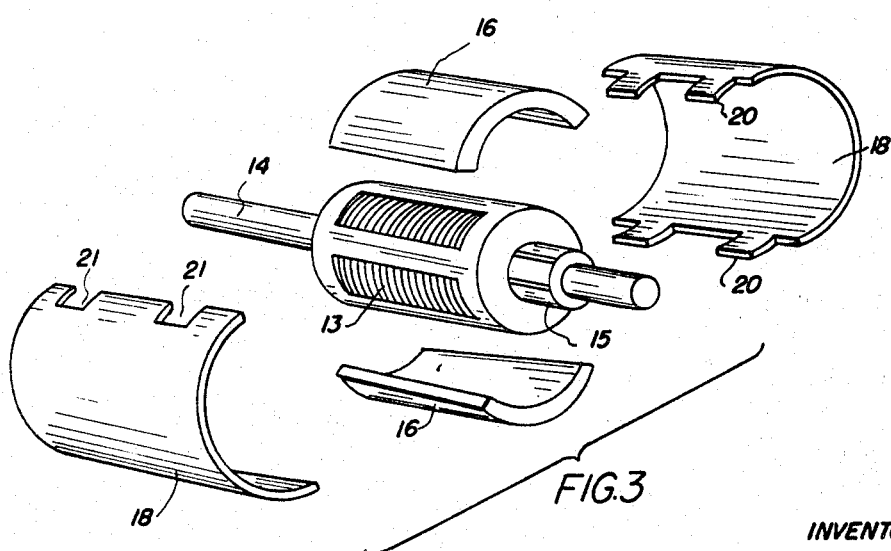
FIGURE 3 is a perspective, exploded view of the motor.

The stator comprises permanent magnets 16, and a casing or frame 17 formed of individual segments 18 whose adjacent edges form a split or gap 19 (see FIGS. 1 and 2). The segments 18 are provided with tongues 20 which fit into grooves 21 for aligning and interlocking the segments.

As shown in FIGS. 2 and 4, the magnets are arcuate in cross section and are spaced a short distance from the outer periphery of the armature to form an air gap 22 which normally is of the order of a few thousandths of an inch. Here, the distance has been exaggerated for illustration purposes.

The central portion 23 of each magnet is what is known as a neutral zone or zone of zero flux, as will be described below. It can be seen that the split or gap 19 between the casing segments is aligned with such neutral zones 23 of each magnet.

Referring to the enlarged schematic view of FIG. 4, it can be seen that the magnets 16 are formed with their inner faces forming, in cross section, segments of a circle which are coaxial with the axis 24 of the rotor. However their outer faces, which are also segments of a circle in cross section, have their axes slightly outwardly spaced at 25 and 25a relative to the rotor axis 24. The casing segments 18 have their inner faces circular in cross section and coaxial with the rotor axis, all as illustrated by the arrows in the figure. Thus, a tapered or wedge-shaped space is formed between the magnets, particularly near their outer ends and the adjacent surfaces of the casing segments. The advantage of this feature of design will be brought out below in describing assembly of the motor.

The magnets are permanently connected to the casing segments by means of a suitable adhesive which permits uninterrupted flux flow, such as a suitable resinous adhesive containing iron particles or the like. Such adhesive 26 fills the tapered space for securing the magnets and the casing segments into a unit or assembly. The magnets which are made of a permanent magnetic material, such as the material commonly known as Alnico, provide a magnetic circuit with lines of flux approximately as shown by the dotted arrows in FIG. 4. As there shown, the lines of flux diverge at 19 into two paths so that the neutral zones 23 are formed at the place where the flux divides within the magnet.

The lines of flux are carried by the casing segments which act as a magnetic flux path. Thus, although the segments are separated or gapped apart at 19, such separation takes place at the neutral or zero point for the flux and the casing is not interrupted or broken in the places where the flux passes, thereby avoiding an increase in the reluctance of the casing material which preferably is formed of the conventional magnetic permeable metal. An additional advantage resides in the ability to assemble the casing segments without the necessity of contact between adjacent segments. This results from the fact that no reluctance gap can form between segments as the magnetic flux does not flow from one segment to the next adjacent segment.

One method of assembly, referring to FIG. 7, includes first preparing a mandrel 27 or rotor form which may be a separate dummy rotor made oversized so as to include the actual rotor diameter as well as the required air gap. The same form may be provided by using an actual rotor upon which suitable shims have been applied.

The magnets 16 are applied against the rotor form 27 and thereafter the casing segments 18 are applied over the magnet with the split or gaps 19 aligned with the neutral zones of the magnets. An inward pressure upon each of the segments moves the magnets into close contact with the form 27 so as to provide a uniform and accurate positioning of the internal surfaces of the magnets which will thereby result in an accurate air gap. Since each segment covers only one-half of each magnet, movement of that segment inwardly will result in pushing the magnet not only inwardly but also transversely of the rotor axis, particularly as a result of the wedging action which comes about because of the formation of the wedge-shaped space as described above in connection with FIG.

4. Thus, manipulation of the segments 18 results in accurately positioning the magnets transversely as well as radially.

After assembly as shown in FIG. 7, the magnets and segments are joined together by the adhesive 26, and the tongues 20 may be welded or otherwise secured in their grooves 21, if necessary. Hence, a complete unit stator is formed upon completion of the above assembly and removal of the rotor form 27. This unit or assembly may now be used with the rotor 11 to make up a complete motor.

While the foregoing description relates to a machine having two magnets, it can be seen that the number of magnets may be varied. For example, in the modification of FIG. 5, one magnet 16 is used with a casing 30 which is split at 31.

At other times, it may be desired to use more than two magnets, such as illustrated in FIG. 6, wherein four magnets 16a are used with an equal number of segments 32. The segments are arranged so that their split or gap 33 in each instance is aligned with the neutral zone of the respective magnets.

The foregoing construction provides what in effect is a collapsible casing which may be moved inwardly to thereby move the magnets both radially inwardly as well as transversely. Hence, an accurate air gap may be obtained. At the same time, although the casing is split or is provided with gaps to make it possible to collapse it, these are so located so as not to affect the normal reluctance of the casing to the flow of magnetic flux.

This invention may be further developed within the scope of the following claims. Accordingly, it is desired that the foregoing be read as being merely illustrative of an operative embodiment of this invention and not in a stricty limited sense.

What I claim as new and desire to secure by Letters Patent of the United States is:

1. A dynamoelectric machine comprising:
    a rotor and a stator;
    said stator comprising a permanent magnet, arranged alongside said rotor and having an inner face spaced a short distance from the periphery of the rotor to form an air gap;
    a casing surrounding the rotor and magnet and formed of a magnetically permeable material for providing a return path for magnetic flux;
    said casing being longitudinally split, with the split being aligned with the neutral region of the magnet, which extends parallel to the rotor axis, with the outer surface of the magnet thereby bridging said longitudinal split and being in contact with the inner surface of the casing on both sides of the longitudinal split;
    said outer casing being forcibily collapsible due to the split, to thereby move the magnet towards the rotor to preset the air gap;
    and means for fixing the casing at the split against collapsing after the air gap is thereby preset.

2. A dynamoelectric machine as defined in claim 1, including a second magnet identical to the first mentioned magnet, with the magnets being arranged at opposite sides of the rotor;
    said casing being also longitudinally split at the neutral region of the second magnet for thereby adjusting the air gaps of both magnets with respect to the rotor by collapsing movement of the casing; and
    means for fixing the casing against collapsing movement due to the splits, after presetting of said air gaps.

3. A dynamoelectric machine as defined in claim 1, said magnet being arcuate in shape and being formed as-cast; and
    said casing portions which overlap said magnet also being arcuate in shape, wherein the portions of the casing adjacent each edge defining the split may move the magnet both radially inwardly of, as well as transversely of, the rotor axis.

4. A dynamoelectric machine as defined in claim 3, wherein the internal shape of said magnet and the shape of said casing portions are each formed as a segment of a circle, which is coaxial with the rotor axis, and the outer surface of the magnet is formed as a segment of a circle whose axis is spaced slightly outwardly of the rotor axis, wherein a wedging action upon the magnet is produced by inward movement of said casing portions.

5. A dynamoelectric machine comprising:
    a rotor with a number of permanent magnets arranged alongside the rotor, with the neutral axis of the magnets being arranged parallel to the rotor axes, the magnets being spaced from the rotor to form an air gap therebetween;
    a casing surrounding the magnets and rotor, said casing comprising a number of longitudinally extending segments, equal in number to the number of magnets, with each pair of adjacent edges of the segments being longitudinally aligned with and positioned at the neutral axis of one of the magnets
    said segments and magnets being arranged to be inwardly movable to thereby adjust the air gaps to predetermined distances; and
    means for fixing the segments and magnets against further movement after presetting said air gaps
    said casing being formed of a magnetically permeable material for thereby functioning as a flux return path, wherein the areas of maximum reluctance of the casing, namely, at each adjacent pair of segment edges, is thus located at the area of minimum magnetic flux.

6. A dynamoelectric machine as defined in claim 5, wherein the internal surfaces of the magnets and the casing segments are each formed in cross section as a segment of a circle which is coaxial with the rotor axis, and the external surfaces of the magnets are formed in cross section as segments of a circle whose axis is spaced slightly outwardly of the rotor axis, so that the casing segments form a wedging contact with the magnets.

7. A dynamoelectric machine as defined in claim 5, said magnets being cast into an arcuate cross-sectional shape and being assembled in as-cast condition.

8. A method of assembling a stator for a dynamoelectric machine of the permanent magnet type, comprising a rotor, a number of as-cast, arcuate in cross-section magnets, and a casing formed of segments equal in number to the number of magnets and formed of a magnetically permeable material, comprising the steps of
    positioning the magnets against and concentric with the inner surface of the stator segments with each adjacent pair of segment edges being aligned with the neutral zone of the magnet which they overlap;
    moving said stator segments and magnets radially inward to establish a predetermined dimension between said magnets so as to form a rotor receiving bore of predetermined dimension; and
    permanently fixing the magnets and casing segments in said predetermined position.

9. A method of assembling a stator for a dynamoelectric machine of the permanent magnet type, comprising a rotor, a number of as-cast, arcuate in cross-section magnets, and a casing formed of segments equal in number of magnets and formed of a magnetically permeable material, comprising the steps of
    positioning the magnets against the outer surface of a form whose outer diameter is equal to the actual rotor diameter plus the predetermined air gap required between the magnets and the actual rotor;
    applying the segments to the outer surfaces of the magnets with each adjacent pair of segment edges being aligned with the neutral zone of the magnet which they overlap;

permanenty fixing the magnets and casing segments in relative positions; and thereafter removing the rotor form to thereby provide an assembled stator unit.

10. A method of assembling a stator for a dynamoelectric machine of the permanent magnet type, comprising a rotor, at least one arcuate in cross-section magnet having a longitudinal, central magnetically neutral zone, and a longitudinally split casing formed of a magnetically permeable material for forming a return flux path, comprising the steps of:

first, positioning the magnet against the outer surface of a form whose outer diameter is equal to the actual rotor diameter plus the predetermined air gap required between the magnet and the actual rotor;

next, applying the casing around the magnet and form, with the casing being in contact with the outer surface of the magnet and with the longitudinal split of the casing being aligned with said magnet neutral zone;

thereafter permanently fixing the casing at its split and joining the magnet to the casing to form a permanent stator unit.

11. A method as defined in claim 10, including the step of forcing inwardly the casing portions adjacent the edges defining the split to force the magnet inwardly into close contact with the rotor form before fixing the casing.

References Cited

UNITED STATES PATENTS

| 2,062,938 | 12/1936 | Ruppe | 310—46 X |
| 2,764,802 | 10/1956 | Feiertag | 310—42 X |
| 3,083,310 | 3/1963 | Tweedy et al. | 310—154 |
| 3,234,416 | 2/1966 | Weitbrecht | 310—153 |

WARREN E. RAY, *Primary Examiner.*

U.S. Cl. X.R.

29—596; 310—154, 259